US010762452B2

(12) United States Patent
Jana et al.

(10) Patent No.: US 10,762,452 B2
(45) Date of Patent: Sep. 1, 2020

(54) SYSTEM AND METHOD FOR DESIGNING AND EXECUTING CONTROL LOOPS IN A CLOUD ENVIRONMENT

(71) Applicant: AT&T Intellectual Property I, L.P., Atlanta, GA (US)

(72) Inventors: Rittwik Jana, Montville, NJ (US); Mazin Gilbert, Warren, NJ (US); Eric Noel, Holmdel, NJ (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 560 days.

(21) Appl. No.: 15/454,050

(22) Filed: Mar. 9, 2017

(65) Prior Publication Data
US 2018/0260745 A1 Sep. 13, 2018

(51) Int. Cl.
*G06Q 10/06* (2012.01)
*G06F 9/48* (2006.01)

(52) U.S. Cl.
CPC ....... *G06Q 10/0631* (2013.01); *G06F 9/4806* (2013.01)

(58) Field of Classification Search
CPC .............................. G06Q 40/00; G06Q 40/06
USPC ......................................................... 705/7.16
See application file for complete search history.

(56) References Cited

U.S. PATENT DOCUMENTS

| 5,657,485 | A * | 8/1997 | Streitenberger | ........ G06F 9/325 711/217 |
| 7,355,477 | B2 | 4/2008 | Mujtaba et al. | |
| 7,843,863 | B2 | 11/2010 | Willenegger et al. | |
| 8,886,732 | B2 * | 11/2014 | Avitabile | ............. G06Q 10/109 709/206 |
| 9,059,816 | B1 | 6/2015 | Simpson et al. | |
| 9,064,244 | B2 * | 6/2015 | Brauninger | .......... G06Q 10/109 |
| 9,369,416 | B2 * | 6/2016 | Bos | ..................... G06Q 10/107 |
| 9,450,744 | B2 | 9/2016 | Simpson | |
| 2011/0238458 | A1 * | 9/2011 | Purcell | .................. G06F 9/5072 705/7.27 |
| 2012/0166254 | A1 * | 6/2012 | Chang | .................... G06Q 10/06 705/7.36 |

(Continued)

OTHER PUBLICATIONS

Iain et al "Establishing timing requirements for control loops in real-time systems", May 2002, Department of Computer Science, University of York, York YO10 5DD, UK, pp. 159-169 (Year: 2002).*

(Continued)

*Primary Examiner* — Romain Jeanty
(74) *Attorney, Agent, or Firm* — BakerHostetler

(57) ABSTRACT

A system for designing and executing control loops in a cloud environment includes a control platform implemented in the cloud environment having a data collection, analytics and events module, a policy module and an application controller module. The system includes a business process management application coupled to the control platform having a control loop designer module for designing a control loop template and a workflow engine for distributing the control loop template. The business process management application is coupled to the data collection analytics and events module of the control platform as well as the policy module in the application controller module to control platform. The control loop is activated by the control platform.

19 Claims, 9 Drawing Sheets

(56) References Cited

U.S. PATENT DOCUMENTS

| | | | |
|---|---|---|---|
| 2013/0060596 A1* | 3/2013 | Gu | G06Q 10/06 |
| | | | 705/7.27 |
| 2013/0218618 A1* | 8/2013 | Purcell | G06F 9/5072 |
| | | | 705/7.13 |
| 2013/0238384 A1* | 9/2013 | Caesar | G06F 8/34 |
| | | | 705/7.27 |
| 2013/0309988 A1 | 11/2013 | Ji et al. | |
| 2015/0161547 A1* | 6/2015 | Aggarwal | G06Q 10/06316 |
| | | | 705/7.26 |
| 2015/0358248 A1 | 12/2015 | Saha et al. | |
| 2015/0377955 A1* | 12/2015 | Shapira | G06F 11/3024 |
| | | | 702/186 |
| 2016/0150076 A1 | 5/2016 | Foladare et al. | |
| 2016/0261365 A1 | 9/2016 | Chen et al. | |

OTHER PUBLICATIONS

"ECOMP (Enhanced Control, Orchestration, Management & Policy) Architecture White Paper"; AT&T Inc.; 31 pages.

Hakiri et al.; "Leveraging SDN for The 5G Networks: Trends, Prospects and Challenges"; Univ de Toulouse; 2015; 23 pages.

Pirinen; "A Brief Overview of 5G Research Activities"; IEEE $1^{st}$ Int'l Conf. 5G for Ubiquitous Connectivity; 2014; 6 pages.

Thoelen et al.; "Component-based Orchestration of Dynamic IaaS Applications"; Proceedings of the $15^{th}$ Int'l Workshop on Adaptive and Reflective Middleware; 2016; 6 pages.

* cited by examiner

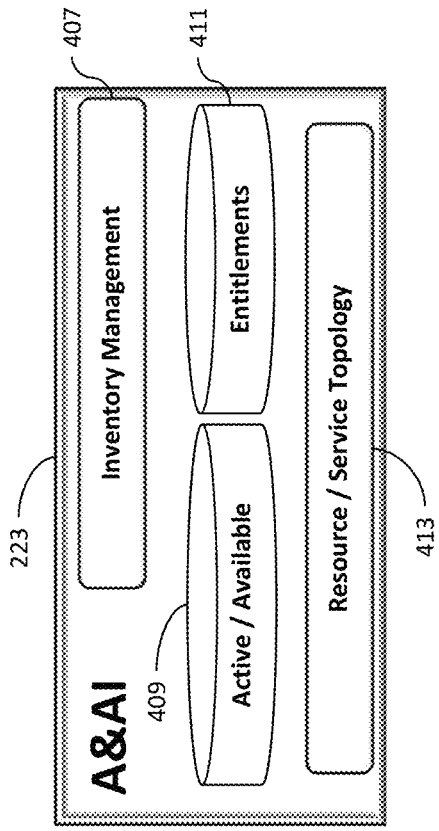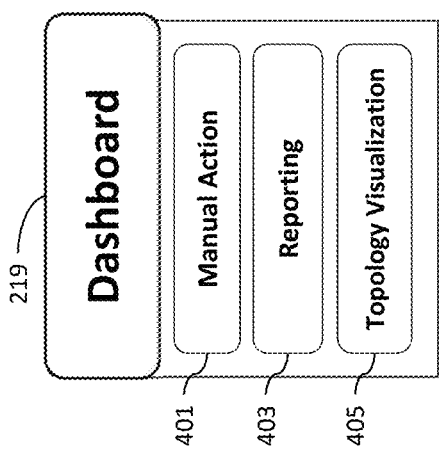
FIG. 4

SYSTEM AND METHOD FOR DESIGNING AND EXECUTING CONTROL LOOPS IN A CLOUD ENVIRONMENT

TECHNICAL FIELD

The present disclosure relates generally to systems and methods for designing and executing control loops and more particularly to systems and methods for designing and executing control loops in a cloud environment using a control loop automation management platform.

BACKGROUND

In a cloud environment, control loop automation can be categorized into open loop or closed loop systems. Open loop systems capture telemetry and diagnostics information from the underlying cloud infrastructure (e.g. syslog, SNMP, fault and performance management events), perform a set of analytics and provide reporting or alarms to the operations team. Closed loop systems continuously monitor the system for fault, performance, security, etc. related problems and compute a set of signatures based on the detected anomalous condition. These signatures are then interpreted and appropriate corrective actions are recommended to repair the system. Once the system has been repaired, a monitoring application checks the status to see if the system responded to alleviate the detected problem.

Control loop systems play a vital role in processes implemented in a cloud based environment. For example, closed and open loops have been implemented to support fault management for limited virtual network functions such as a wide-area virtual network management framework which acts as an infrastructure provider to manage the physical resources and service provider to build and manage virtual networks on the physical resources.

Control loops in cloud based environments have been developed as independent applications. However, traditional monolithic architectures for control loop are not flexible enough to meet the demands of the operators of the future. For example, control loops are traditionally written with most of the critical logic embedded in one software module.

There is a need to develop a platform that will enable faster development of scalable control loop systems.

SUMMARY

The needs existing in the field are addressed by the present disclosure, which relates to systems, methods and computer useable media for designing and executing control loops in a cloud environment though a control loop automation management platform.

In one embodiment, a method for designing and executing a control loop for a system in a cloud environment includes accessing a web based portal in a platform implemented in the cloud environment, where the web based portal enables a set of control functions. This aspect also includes accessing a business process management application through the web based portal and developing a control loop template for the control loop using the business process management application. The method also includes configuring the control loop template using the business process management application; activating the control loop template to provide an activated control loop; and monitoring the activated control loop. Other embodiments of this method include creating a business process modeling notation model for the control loop. Yet another embodiment includes creating a control loop flowchart using the business process management application. Another embodiment includes configuring the control loop template by adding microservices to the control loop template, determining a metric to serve as an input to the micro service, and associating a policy to the micro service. Another embodiment includes the reporting of the status of the control loops with data collection, analytics and events API in the platform. In yet another embodiment the monitoring step comprises reporting is status of the control loop to a dashboard in the web-based portal.

One general aspect includes a system for designing and executing a control loop including a control platform implemented in a cloud environment. The control platform includes a data collection, analytics and events module; a policy module; and an application controller module. The system also includes a business process management application coupled to the control platform. The business process management application includes a control loop designer module for designing a control loop template; and a workflow engine for distributing the control loop template. The business process management application is coupled to the data collection, analytics and events module, the policy module and the application controller module of the control platform. The data collection, analytics and events module, the policy module and the application controller module of the control platform are used to activate the control loop template. In another embodiment the system further comprises a reporting dashboard for reporting a status of the control loop. In yet another embodiment the system comprises a web-based portal that enables access to the business process management application. In another embodiment the system includes a control design module for creating a business process model and notation model of the control loop. In yet another embodiment the system includes a business process management application including a workflow engine for distributing the business process modeling notation model. In another embodiment the system includes a set of data collection analytics and events module APIs, policy APIs and application control APIs. In another embodiment the system includes a reporting dashboard that reports the status of the control loop responsive to a query of the data collection analytics and events module on the control platform.

Another general aspect includes a computer-readable storage medium having a tangible physical structure, the computer-readable storage medium including executable instructions that when executed by a processor cause the processor to effectuate accessing a web based portal in a platform implemented in the cloud environment, wherein the web based portal enables a set of control functions. The executable instructions also effectuate accessing a business process management application through the web based portal and developing a control loop template for the control loop using the business process management application. The executable instructions also effectuate configuring the control loop template using the business process management application; activating the control loop template to provide an activated control loop; and monitoring the activated control loop. In another embodiment the computer readable medium includes instructions for accessing a control loop designer module to create a business process model and notation model for the control loop. In another embodiment the computer readable medium includes instructions for activating the control loop template by executing an executable data model in the platform. In yet another embodiment the computer readable medium provides instructions for reporting the status of the activated control loop through platform data collection analytics and events API. In yet another embodiment the computer readable medium includes instructions for reporting a status of the control loop to a dashboard in the platform.

BRIEF DESCRIPTION OF THE DRAWINGS

FIG. 4 is a block diagram of the dashboard and active and available inventory module of the platform for enhanced control, orchestration, management and policy.

DETAILED DESCRIPTION OF ILLUSTRATIVE EMBODIMENTS

Figure 1:
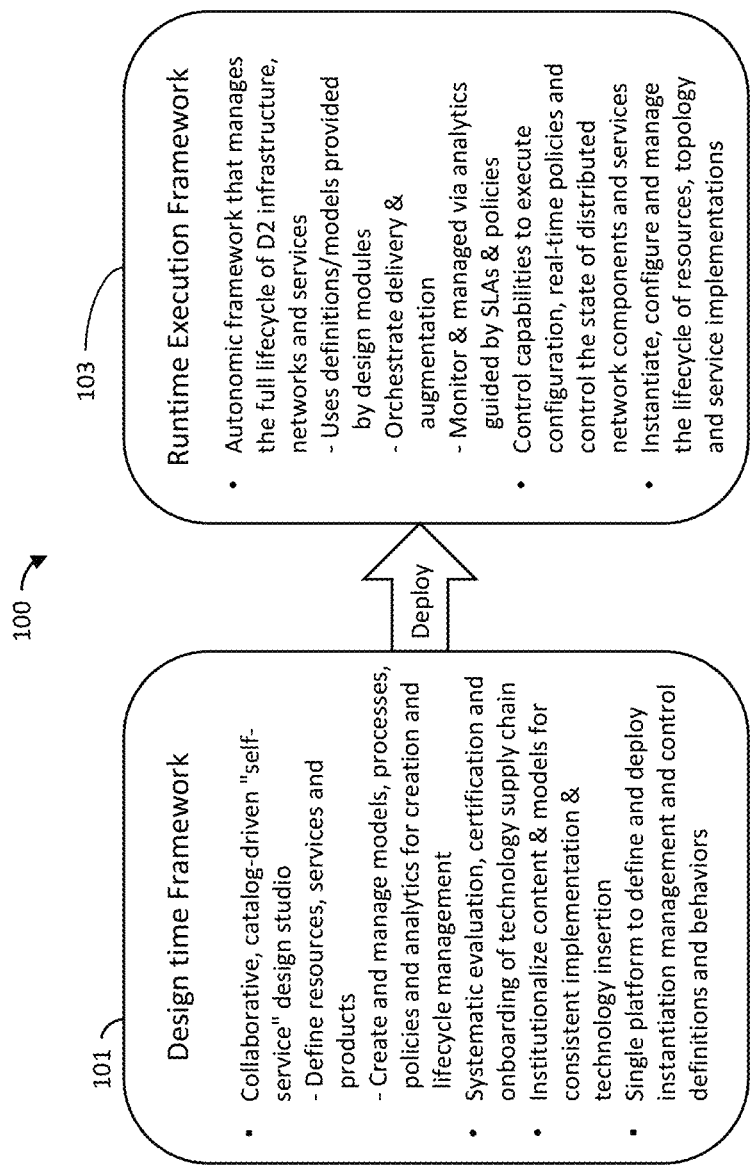
FIG. 1 is a block diagram illustrating the architecture of an enhanced control, orchestration, management and policy platform in which an embodiment of a control loop automation management platform may be implemented. The embodiment may be implemented in two types of architectures, namely centralized or distributed.

Illustrated in FIG. 1 is a schematic of the architecture of an enhanced control, orchestration, management and policy platform, (ECOMP platform 100) that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances have been transformed into software applications. In the integrated cloud environment the dynamic cloud capabilities are applied to applications—i.e., virtual network functions (VNFs)—thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 100 enables product/service independent capabilities for design, creation and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment based resources, services, products and the components of the ECOMP platform 100. The design time framework component 101 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
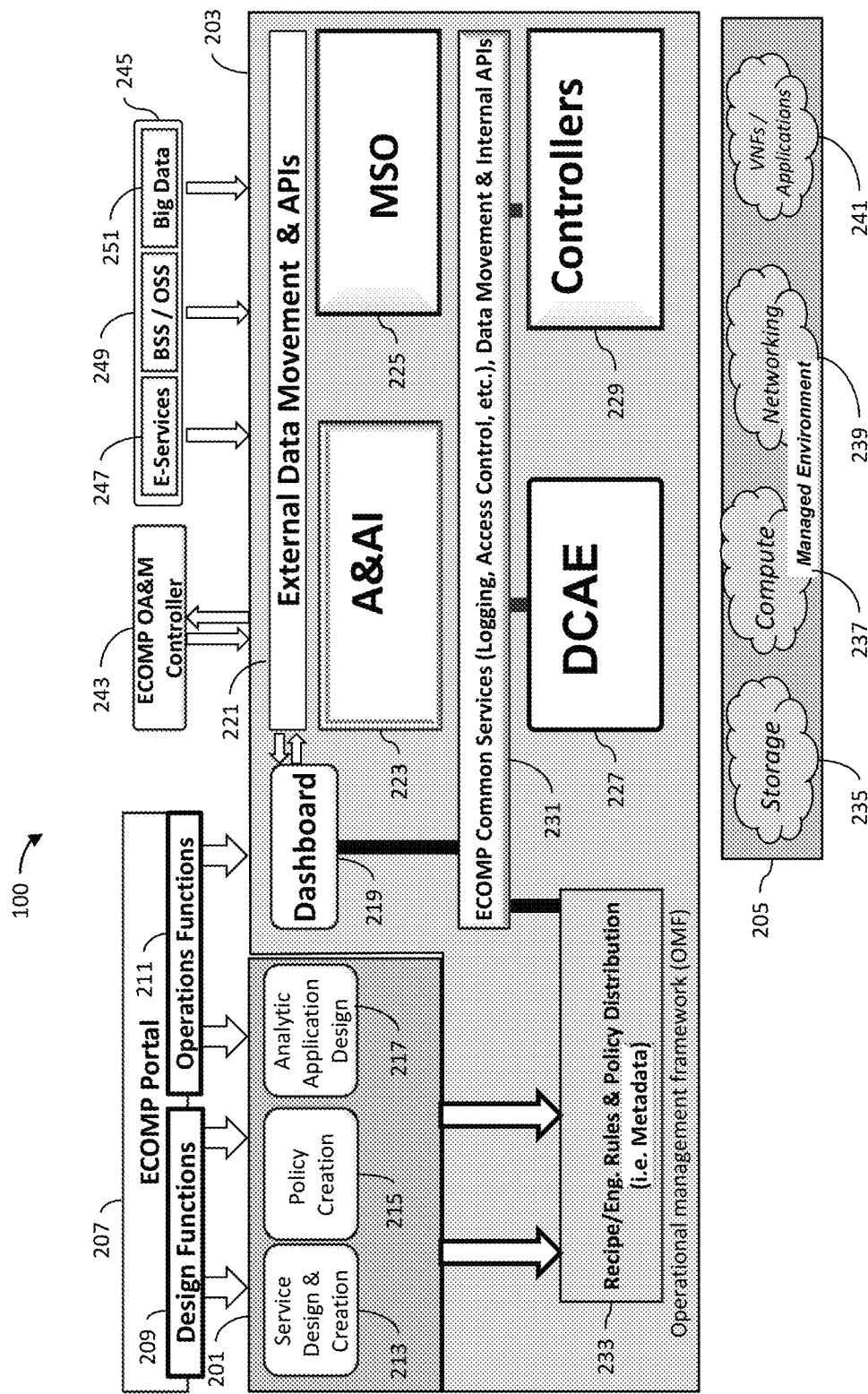
FIG. 2 is a block diagram of a platform for enhanced control, orchestration, management and policy in which embodiments of the control loop automation management platform may be implemented.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219 the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Figure 3:
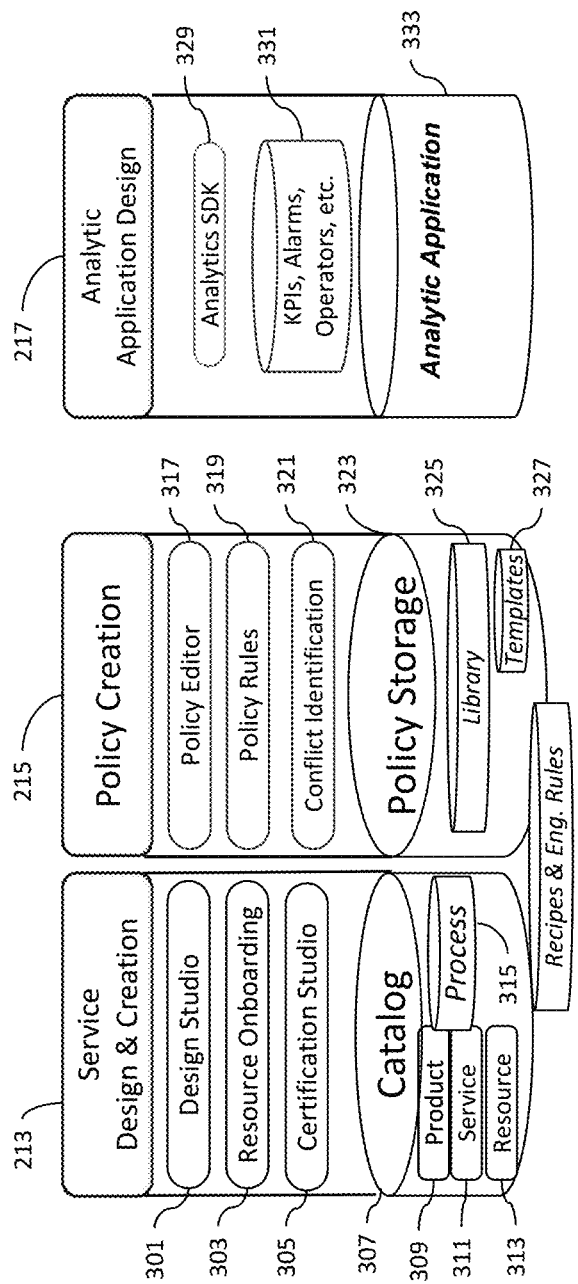
FIG. 3 is a block diagram of the service design and creation component, the policy creation component and the analytic application design component of the platform for enhanced control, orchestration, management and policy.

Illustrated in FIG. 3 are the subcomponents of the service design and creation component 213. The service design and creation component 213 is an integrated development environment with tools, techniques and repositories to define/simulate/certify cloud environment assets as well as their associated processes and policies. The service design and creation component 213 may include a design studio subcomponent 301; a resource onboarding subcomponent 303; a certification studio subcomponent 305; a catalog subcomponent 307. Catalog subcomponent 307 may include information about groups such as products 309, services 311, resources 313 and processes 315.

The policy creation component 215 deals with policies, which are conditions and requirements, constraints, attributes, or needs that must be provided, maintained, and/or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders, (Network/Service Designers, Operations, Security, customers, etc.). In addition, input from various sources (service design and creation component 213, policy editor 317, customer input, etc.) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, etc., as well as storage for analytic application 333.

As shown in FIG. 4, the dashboard 219 includes a manual action subcomponent 401, a reporting subcomponent 403 and a topology visualization subcomponent 405. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The inventory and topology data includes resources, service, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;

Deliver topologies and graphs;

Maintain relationships to other key entities (e.g., location) as well as non-integrated cloud environment inventory;

Maintain the state of active, available and assigned inventory within the ECOMP platform 100;

Allow introduction of new types of Resources, Services, and Products without a software development cycle (i.e., be metadata driven);

Be easily accessible and consumable by internal and external clients;

Provide functional APIs that expose invariant services and models to clients;

Provide highly available and reliable functions and APIs capable of operating as generic cloud workloads that can be placed arbitrarily within the cloud infrastructure capable of supporting those workloads;

Scale incrementally as volumes in the ECOMP platform 100 and cloud infrastructure scales;

Perform to the requirements of clients, with quick response times and high throughput;

Enable vendor product and technology swap-outs over time, e.g., migration to a new technology for data storage or migration to a new vendor for MSO 225 or Controllers 229;

Enable dynamic placement functions to determine which workloads are assigned to specific components of the ECOMP platform 100 (i.e., Controllers 229 or VNFs) for optimal performance and utilization efficiency; and Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
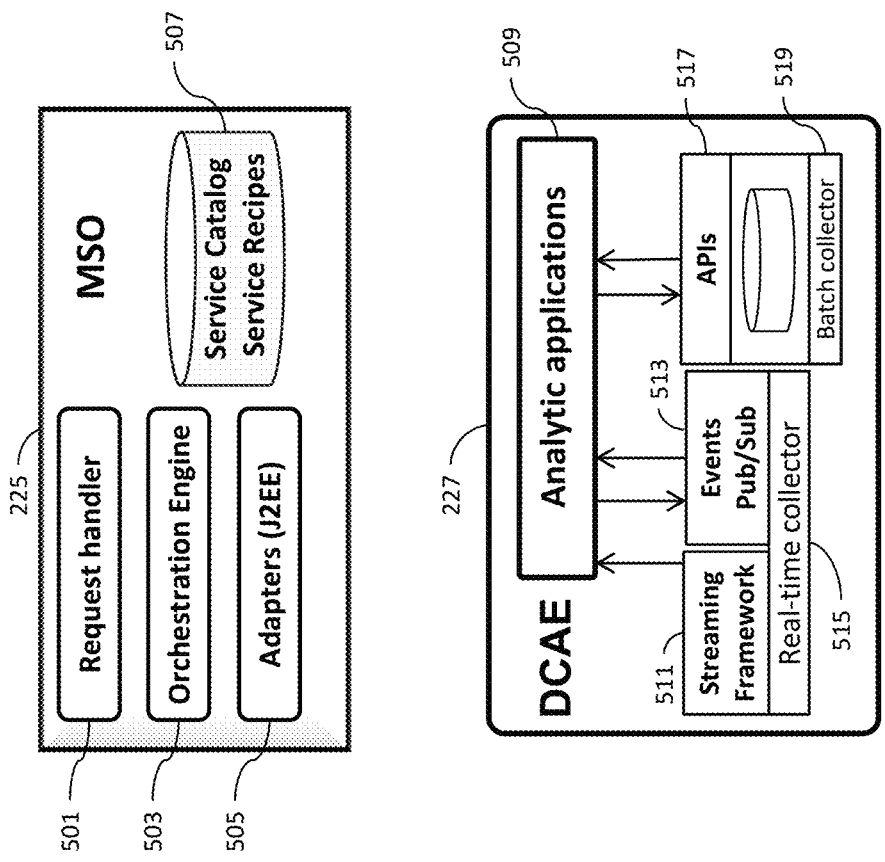
FIG. 5 is a block diagram of the master service orchestrator component and the data collection, analytics and events component of the platform for enhanced control, orchestration, management and policy.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine 503 will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session & call records) needed for detecting network & service conditions, etc. The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, etc.) for other analyses.

The DCAE module 227 includes an analytic framework which is an environment that allows for development of real-time applications (e.g., analytics, anomaly detection, capacity monitoring, congestion monitoring, alarm correlation etc.) as well as other non-real-time applications (e.g., analytics, forwarding synthesized or aggregated or transformed data to Big Data stores and applications); the intent is to structure the environment that allows for agile introduction of applications from various providers (Labs, IT, vendors, etc.). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, etc. to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, etc.), Network level (bandwidth, circuits, etc.), Service or Customer levels. A testing and trouble-shooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted. These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 6:
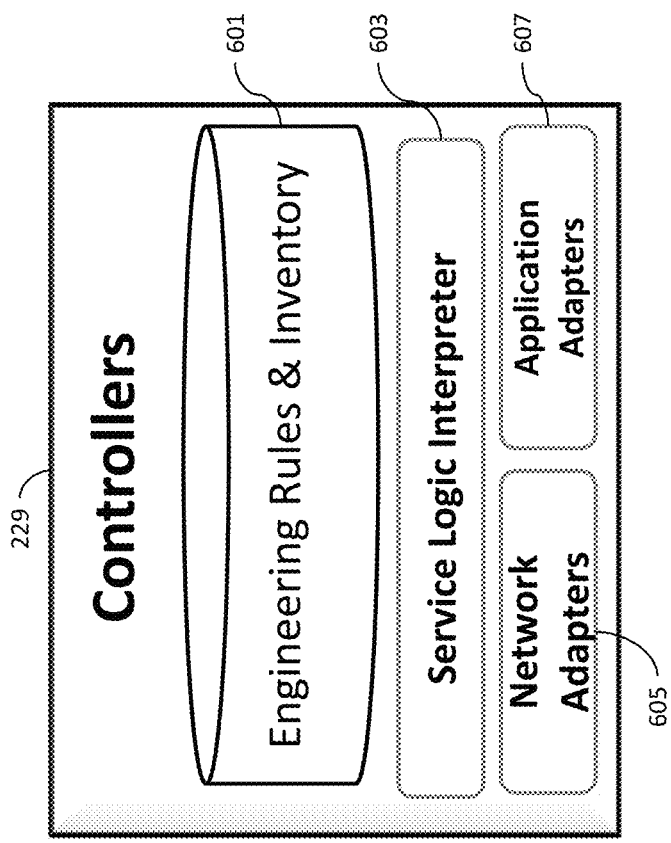
FIG. 6 is a block diagram of the components for the controllers of the platform for enhanced control, orchestration, management and policy.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

Figure 7:
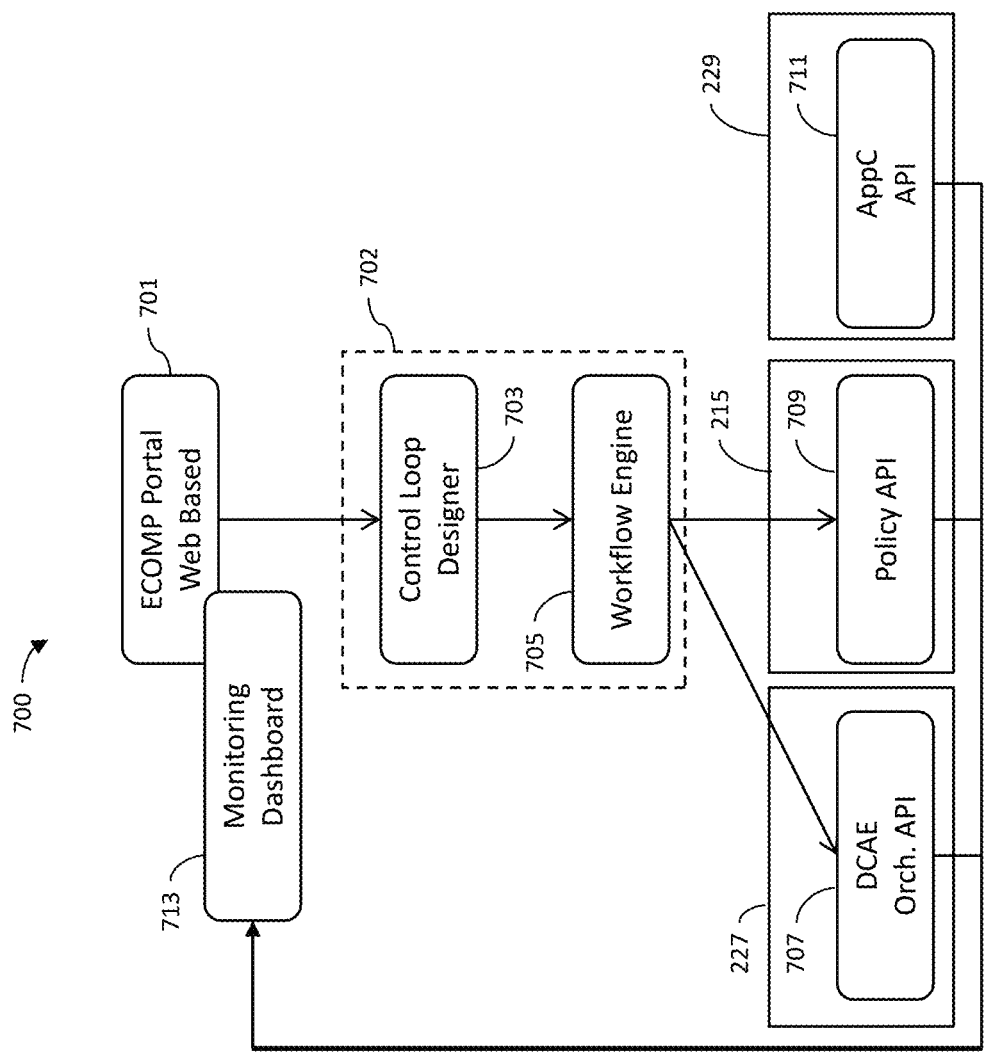
FIG. 7 is a block diagram of an embodiment of a control loop automation management platform.

Illustrated in FIG. 7 is the design flow of a control loop automation management platform 700. The solution has primarily three phases. These are pre-design of a template, configuration and distribution of template, instantiation of blueprint and monitoring. The pre-design allows control loop planners to create generic templates that describe a particular control loop flow. This can include creating a service chain that includes a telemetry collector object, followed by alarm enrichment module, followed by a signature detection and event generation module. During the configuration phase, a planner chooses from the set of templates and configures them for a particular service. After configuration, the populated template is distributed and sent to the respective components of the ECOMP platform 100. When a new site comes up or a VNF is turned on, the control loop is activated upon detection of a trigger from a runtime inventory (e.g. AI module 223)

The control loop automation management platform 700 uses components of ECOMP platform 100 including the ECOMP web-based portal 701 incorporated into the ECOMP platform 100. The ECOMP web-based portal 701 enables authentication, construction, configuration, certification, testing, governance approval and distribution of control loop templates. The control loop automation management platform 700 also includes a business process management application 702 coupled to the ECOMP platform 100, including a control loop designer 703, and a workflow engine 705. The control loop designer 703 and the workflow engine 705 are used to create and distribute the control loop that accesses a set of APIs in DCAE module 227 (DCAE APIs 707), a set of APIs in policy creation component 215 (policy APIs 709) and a set of APIs in controller 229 (application controller APIs 711). These APIs reside within their respective components of the ECOMP platform 100. The control loop automation management platform 700 provides reports to a monitoring dashboard 713 responsive to queries of the DCAE module 227. The monitoring dashboard 713 enables telemetry data capture relevant to the performance of the control loop, status update and diagnosis of failures.

Figure 8:
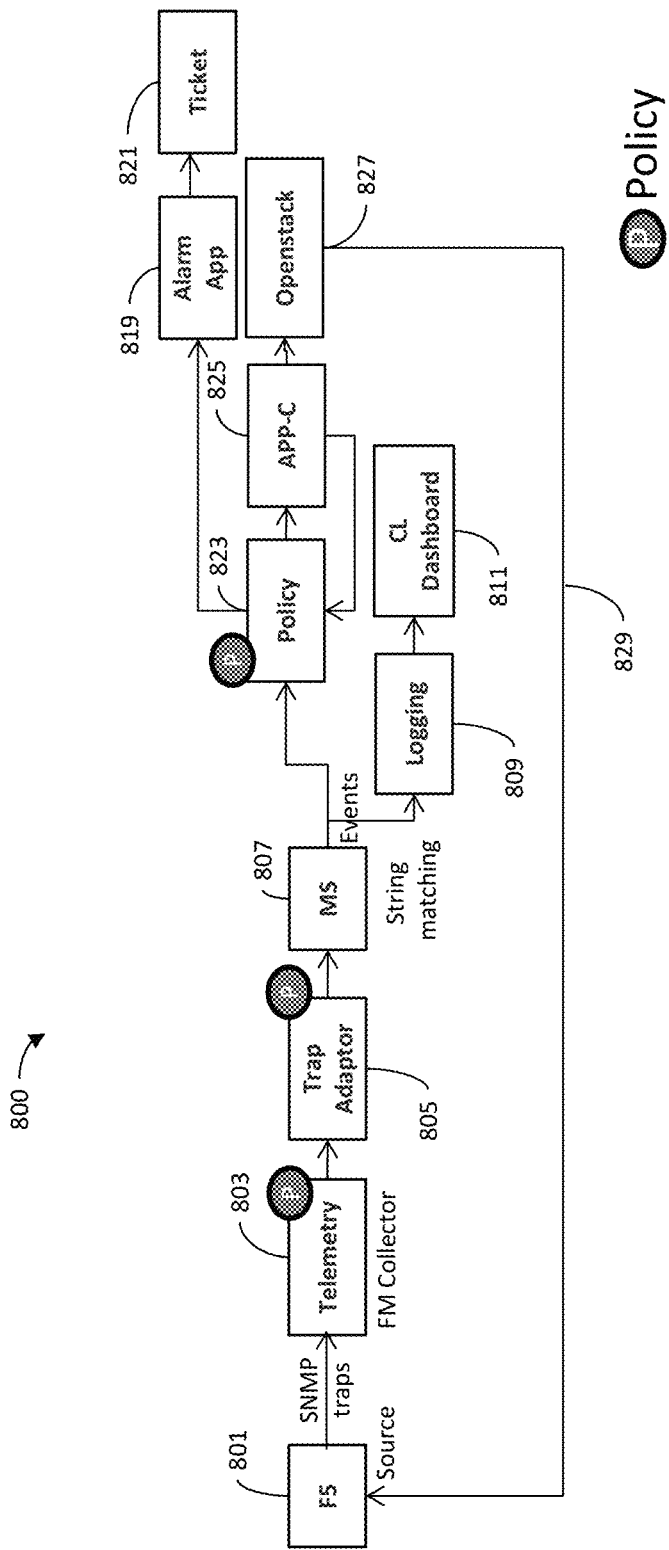
FIG. 8 is a flowchart of a control loop designed and executed by an embodiment of the control loop automation management platform.

FIG. 8 is a flow chart of an example control loop 800 for a firewall application. Data from a firewall application 801 (e.g. F5) is collected using a simple network management protocol (SNMP) and is transmitted to a telemetry module 803 that serves as a fault management collector. The telemetry module 803 takes raw data from the firewall application 801 and sends it to trap adaptor 805. The trap adaptor 805 normalizes the data structure and enhances it with flags. The normalized and enhanced data is sent to the microservice 807 that is an analytic module that acts as a fault detector. Detected faults may be sent to a logging module 809 that stores event and fault data. The event and fault data is sent to control loop dashboard 811 that provides a view of the runtime control loop. The detected faults may also be sent to a policy module 823 that makes the decisions about what action must be taken based on the fault that has been detected. In some cases the actions may be sent to an alarm application 819 (e.g. RUBY) that looks out for all alarms if the closed loop does not function and sends the alarms out to a ticket function 821 for action by a human being. Normally, the policy module 823 sends information about the decisions that must be taken to the application controller 825. The application controller 825 sends the actions to a software platform 827 (such as OpenStack) that controls compute, storage and networking resources in a system. The software platform 827 forwards instructions back to the firewall application 801. The activities of the telemetry module 803, the trap adaptor 805 and the policy module 823 may be configured using policies that can change the behavior of the telemetry module 803, the trap adaptor 805 and the policy module 823. The control loop can change its state, actions, policies or analytics processing based on feedback information provided through a feedback loop 829. Feedback information may be provided either without supervision (automated approach) or with supervision (human intervention).

Figure 9:
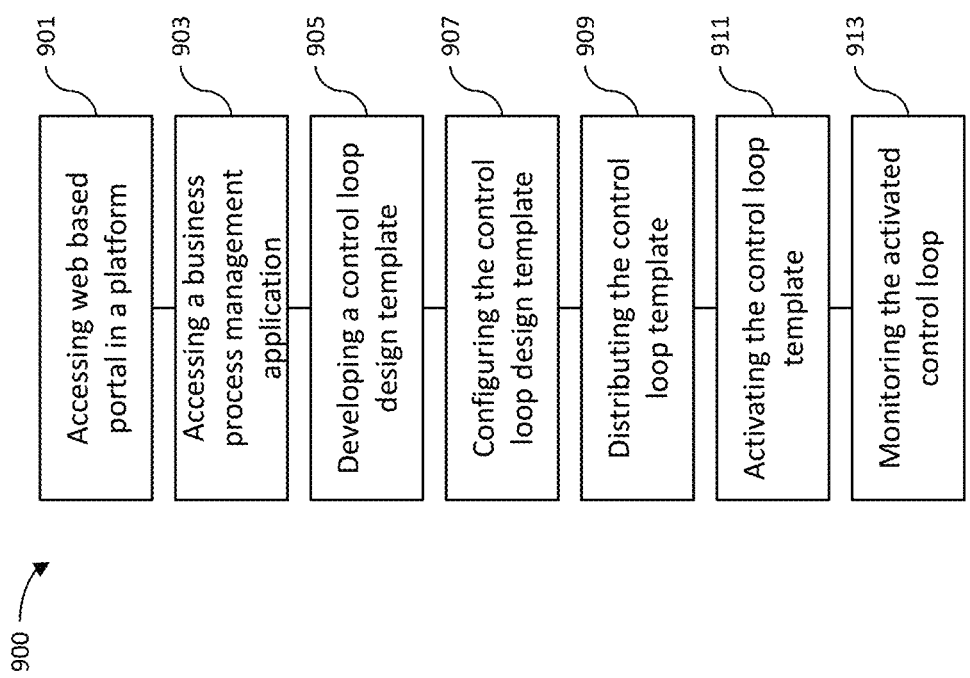
FIG. 9 is a flowchart of an embodiment of a method for designing and executing a control loop in a system in a cloud environment.

FIG. 9 is a flowchart of a method 900 for designing and executing a control loop for a system in a cloud environment.

In step 901 the method 900 provides access to a web based portal in a platform implemented in the cloud environment. The landing page of the web based portal provides a set of control functions including access to a project; the ability to save a project; user authentication, and role based authentication. The control functions may also include construction, configuration, certification, testing, governance, approval and distribution of control loop templates.

In step 903 the method 900 accesses a business process management application through the web based portal. The business process management application enables control loop flowchart design, the ability to add microservices to a control loop template; define the policies for defining the actions for the control loop, and the ability to choose which metric will be the input to the microservice. The business process management application may be used to create a service task using the APIs of the ECOMP platform 100 and allow the user to choose which action is applicable for the controller 229.

In step 905 the method 900 develops a control loop template for the control loop using the business process management application. The control loop template is developed by creating a control loop flowchart and creating a business process modeling notation model for the control loop.

In step 907 the method 900 configures the control loop template using the business process management application. Configuration of the control loop may include adding a micro service to the control loop template; determining a metric to serve as an input to the microservice; and associating a policy to the microservice.

In step 909 the method 900 distributes a control loop template to the system.

In step 911 the method 900 activates the control loop template to provide an activated control loop. The workflow engine 705 communicates with ECOMP platform 100 through a set of well-defined APIs specified by the ECOMP platform 100. These APIs include DCAE API 707 (indicating what collectors to use, what microservices to instantiate to support a closed loop use case.) and the Policy API 709 (including the policy rules for control loop automation, configuration parameters, event to publish on detecting signature, desired action (i.e. recipe) and actor to take corrective action.) using representational state transfer (REST) Web services. The application controller API 711 (preloaded with the action) is then accessed to configure and/or start/stop the control loop. The activated control loop may be provided with a feedback loop that provides feedback information to the activated control loop whereby the state, actions, policies or analytics processing can be changed based on the feedback information. The feedback information may be provided without supervision (automated approach) or with supervision (human intervention).

In step 913 the method 900 monitors the activated control loop. Monitoring is accomplished by reporting a status of the control loop through a data collection, analytics, and events API in the platform. Status of the control loop is reported to a dashboard in the web-based portal. The monitoring dashboard displays status responsive to queries of the DCAE module 227 for status, and enables telemetry data capture relevant to the performance of the control loop, status update and diagnosis of failures. The control loop system may change its velocity and frequency to monitor data and functions depending on historical events (such as previous failures, speed of previous failures, etc.).

As described above, the exemplary embodiments can be in the form of processor-implemented processes and devices for practicing those processes, such as a server in a regional network or cloud data center. The exemplary embodiments may be embodied as either centralized or distributed hardware and software. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method for designing and executing a control loop for a system in a cloud environment comprising:
   receiving, by a computer in a business process management application, data from a web based portal in a platform implemented in the cloud environment, wherein capabilities of the cloud environment include instantiation of virtual machines;
   developing, by the computer in the business process management application, a control loop template for the control loop;
   adding, by the computer in the business process management application, a microservice to the control loop template;
   defining, by the computer in the business process management application, policies for defining actions of the control loop;
   adding, by the computer in the business process management application, a metric to serve as an input to the microservice;
   associating, by the computer in the business process management application, a policy to the microservice;
   activating, by the computer in the platform, the control loop template to provide an activated control loop; and
   monitoring, by the computer in the platform, the activated control loop.

2. The method of claim 1 wherein the web based portal comprises a set of control functions that provide access to the business process management application and the platform.

3. The method of claim 1 wherein developing the control loop template comprises creating a business process model and notation model for the control loop.

4. The method of claim 1 wherein developing the control loop template comprises receiving data related to a control loop flowchart in the business process management application.

5. The method of claim 1 wherein monitoring the activated control loop comprises reporting a status of the control loop through an API in a data collection, analytics and events module in the platform.

6. The method of claim 1 further comprising providing feedback information to the activated control loop whereby state, actions, policies or analytics processing can be changed based on the feedback information.

7. The method of claim 1 wherein the activated control loop changes velocity and frequency to monitor data and functions depending on historical events.

8. A system for designing and executing a control loop in a cloud environment comprising:
   a memory for storing computer instructions;
   a host computer coupled with the memory, wherein the host computer, responsive to executing the computer instructions, performs operations comprising:
      receiving, in a business process management application, data from a web based portal in a platform implemented in the cloud environment, wherein capabilities of the cloud environment include instantiation of virtual machines;
      developing, in the business process management application, a control loop template for the control loop;
      adding, in the business process management application, a microservice to the control loop template;
      defining, in the business process management application, policies for defining actions of the control loop;
      adding, in the business process management application, a metric to serve as an input to the microservice;
      associating, in the business process management application, a policy to the microservice;
      activating, in the platform, the control loop template to provide an activated control loop; and
      monitoring, in the platform, the activated control loop.

9. The system of claim 8 wherein the web based portal comprises a set of control functions that provide access to the business process management application and the platform.

10. The system of claim 8 wherein the operations performed by the computer for developing the control loop template comprises creating a business process model and notation model for the control loop.

11. The system of claim 8 wherein the operations performed by the computer for developing the control loop template comprises receiving data related to a control loop flowchart in the business process management application.

12. The system of claim 8 wherein the operations performed by the computer for monitoring the activated control loop comprises reporting a status of the control loop through an API in a data collection, analytics and events module in the platform.

13. The system of claim 8 wherein the host computer, responsive to executing the computer instructions performs the operations further comprising providing feedback information to the activated control loop whereby state, actions, policies or analytics processing can be changed based on the feedback information.

14. The system of claim 8 wherein the activated control loop changes velocity and frequency to monitor data and functions depending on historical events.

15. A non-transitory computer readable medium, including program instructions executing on a computer, for designing and executing a control loop for a system in a cloud environment, the program instructions including instructions for performing the steps of:

receiving, in a business process management application, data from a web based portal in a platform implemented in the cloud environment, wherein capabilities of the cloud environment include instantiation of virtual machines;

developing, in the business process management application, a control loop template for the control loop;

adding, in the business process management application, a microservice to the control loop template;

defining, in the business process management application, policies for defining actions of the control loop;

adding, in the business process management application, a metric to serve as an input to the microservice;

associating, in the business process management application, a policy to the microservice;

activating, in the platform, the control loop template to provide an activated control loop; and monitoring, in the platform, the activated control loop.

16. The non-transitory computer readable medium of claim 15 wherein the web based portal comprises a set of control functions that provide access to the business process management application and the platform.

17. The non-transitory computer readable medium of claim 15 wherein the instructions for performing the steps of developing the control loop template comprises accessing a control loop designer module to create a business process model and notation model for the control loop.

18. The non-transitory computer readable medium of claim 15 wherein the instructions for performing the steps of activating the control loop template comprises executing an executable data model in the platform.

19. The non-transitory computer readable medium of claim 15 wherein the instructions for performing the step of monitoring the activated control loop comprises reporting a status of the activated control loop through an API in a data collection, analytics and events module in the platform.

* * * * *